United States Patent Office 3,328,495
Patented June 27, 1967

3,328,495
PHOSPHORUS ISOCYANIDE DICHLORIDE COMPOUNDS
Bertram Anders, Cologne-Nippes, Engelbert Kühle, Cologne-Stammheim, and Hugo Malz, Leverkusen, Germany, assignors to Farbenfabriken Bayer Aktiengesellschaft, Leverkusen, Germany, a German corporation
No Drawing. Filed Nov. 21, 1963, Ser. No. 325,456
Claims priority, application Germany, Dec. 22, 1962,
F 38,640
7 Claims. (Cl. 260—959)

Object of the present invention are phosphorus isocyanide dihalides and a process for their production.

A process has now been found for the production of phosphorus-isocyanide-dichloride compounds of the general formula

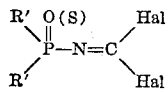

wherein R and R' represent alkyl, aryl, alkoxy, aroxy, thiaalkyl, thiaaryl, dialkylamino, diarylamino or aralkyl radicals in which phosphorylated mustard oils are halogenated. A chlorination according to the process of the invention proceeds, in accordance with the following diagram:

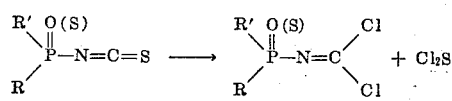

In the foregoing general formulae, R and R' represent alkyl, aryl or aralkyl radicals, which optionally are bonded by way of oxygen, sulphur or nitrogen to the phosphorus. Mustard oils which are suitable for the process include for example, dimethoxy-(thio)-, diethoxy-(thio)-, di-n-butoxy, di-iso-butoxy, dipropoxy-, diphenoxy-, dimethyl-(thio)-, methylethoxy-, chloromethylethoxy-, phenylethoxy- and bis-dimethylamino-(thio)-phosphoryl mustard oils.

The reaction according to the process is conducted at temperatures from —50 to +150°, advantageously from 0 to 100° C., the phosphorylated mustard oils being reacted with chlorine or bromine. For better control of the reaction, it is advantageous that it be carried out in the presence of inert solvents, e.g. aliphatic or aromatic, and optionally halogenated, hydrocarbons, for example in benzene, chlorobenzene, dichlorobenzene, methylene chloride, chloroform, dichlorethane or carbon tetrachloride. The addition of chlorination catalysts, for example $TiCl_4$, $AlCl_3$ and $FeCl_3$, frequently leads to acceleration of the reaction. The new phosphoryl-isocyanide-dihalides are colorless or yellowish liquids, some of which can be distilled. They are used as intermediates in the preparation of novel organic phosphorus compounds, for example for the production of additives for lubricants, and of insecticides.

The compound of the formula

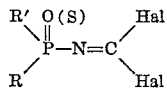

may be reacted with thioalcohols of the formula

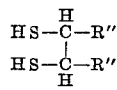

wherein R'' represents hydrogen and lower alkyl radicals to form compounds

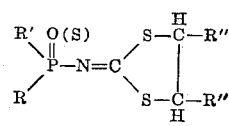

which are disclosed as insecticides in Belgian Patent 618,155.

Example 1

71 g. of chlorine are introduced into a solution of 97.5 g. of diethoxyphosphoryl mustard oil in 100 cc. of carbon tetrachloride at 70 to 76° C. and the solvent is distilled off in vacuo. The yellowish red liquid which remains is fractionated in oil pump vacuum. The main fraction is 99 g. of diethoxyphosphoryl-isocyanide-dichloride in form of a colourless liquid of boiling point 75–78° C./0.08 mm.

*Analysis.*—Calculated: Cl, 30.2; N, 5.98; P, 13.23. Found: Cl, 29.3; N, 6.1; P, 13.6.

Example 2

20 g. of diethoxyphosphoryl mustard oil and 0.4 cc. of $TiCl_4$ are dissolved in 20 cc. of carbon tetrachloride and reacted at room temperature with 15 g. of chlorine. Thereafter, the mixture is distilled by fractionation; there are obtained 19 g. of diethoxyphosphoryl-isocyanide-dichloride of boiling point 75–78° C./0.08.

Example 3

63.3 g. of diethoxythiophosphoryl mustard oil in 65 cc. of $CCl_4$ are reacted below —10° C. with 43 g. of $Cl_2$ and the solvent is removed by distillation in vacuo. There remain 7 g. of yellow liquid.

*Analysis.*—Calculated: Cl, 28.3; P, 12.38; N, 5.60. Found: Cl, 27.9; P, 12.9; N, 5.8.

Example 4

54.9 g. of dimethoxythiophosphoryl mustard oil in 55 cc. of carbon tetrachloride are reacted below —10° C. with 43 g. of chlorine. The mixture is slowly brought to room temperature and freed from the solvent by distillation. There remain 62 g. of dimethoxythiophosphoryl-isocyanide-dichloride.

Example 5

40 g. of $Cl_2$ are introduced into a solution of 73 g. of diphenoxyphosphoryl mustard oil in 75 cc. of $CCl_4$. The solvent is removed by vacuum distillation and there remain 81 g. of diphenoxyphosphoryl-isocyanide-dichloride.

*Analysis.*—Calculated: Cl, 21.49; N, 4.24; P, 9.39. Found: Cl, 21.2; N, 4.22; P, 9.05.

Di-n-butoxyphosphoryl-isocyanide-dichloride having a boiling point of 104–108° C./0.08 mm. is obtained in corresponding manner.

Example 6

61 g. of $Cl_2$ are introduced into 90 g. of diisobutoxyphosphoryl mustard oil at a temperature of 10 to 30° C. The lower boiling fractions are removed by application of vacuum. There are recovered 76 g. of diisobutoxyphosphoryl isocyanide dichloride having a $B.P._{0.04}$ of 87 to 89° C.

Example 7

To a solution of 9.4 g. of dithioethylene glycol and 23.4 g. of diethoxyphosphoryl-isocyanide-dichloride in 200 ml. of benzene there is added a solution of 20.2 g. of triethylamine in 50 ml. of benzene. The reaction is completed at 50 to 60° C. The mixture is filtered to remove the precipitated salt, the solvent is removed and an oil is recovered which consists of 2-(diethoxyphosphorylimino)-1,3-diethiolane. (This compound is disclosed in Example 15 of Belgian Patent 618,155 as having insecticidal properties.)

The compounds dimethoxyphosphoryl-isocyanide-dichloride, diethoxythiophosphoryl-isocyanide-dichloride, diphenoxyphosphoryl-isocyanide-dichloride and diphenoxythiophosphoryl-isocyanide-dichloride may be used instead of diethoxyphosphoryl-isocyanide-dichloride in this reaction. The resulting analogous compounds also possess insecticidal properties.

We claim:

1. Phosphorus isocyanide dihalides of the formula

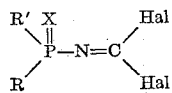

wherein R and R' are members of the group consisting of a $C_1$–$C_6$ alkyl, $C_1$–$C_6$ alkoxy, phenyl, phenoxy, and phenylethoxy and Hal is a member of the group consisting of chlorine and bromine and X is a member of the group consisting of oxygen and sulfur.

2. Phosphorus isocyanide dihalides of the formula

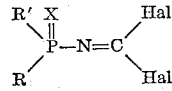

wherein R' and R are $C_1$–$C_6$ alkoxy radicals, Hal is a member of the group consisting of chlorine and bromine and X is a member of the group consisting of oxygen and sulfur.

3. Phosphorus isocyanide dihalides of the formula

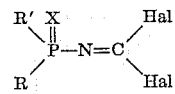

wherein R and R' represent phenoxy radicals, Hal is a member of the group consisting of chlorine and bromine and X is a member of the group consisting of oxygen and sulfur.

4.

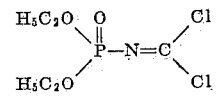

5.

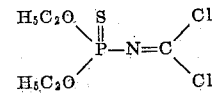

6.

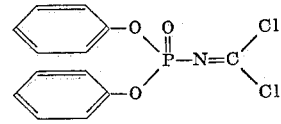

7.

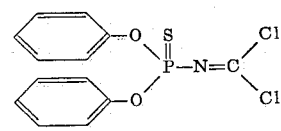

References Cited

J. Amer. Chem. Soc., 44 (1922), pages 2896–2900 relied on.

CHARLES B. PARKER, *Primary Examiner.*

B. BILLIAN, *Assistant Examiner.*